(12) United States Patent
Vizzio et al.

(10) Patent No.: US 11,131,425 B1
(45) Date of Patent: Sep. 28, 2021

(54) THREE AXIS STABILIZATION PLATFORM

(71) Applicant: The United States of America as represented by the Secretary of the Navy, Newport, RI (US)

(72) Inventors: Paul J Vizzio, New York, NY (US); David J Bamford, Wakefield, RI (US); Adam B Proulx, Whitman, MA (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 17/020,904

(22) Filed: Sep. 15, 2020

(51) Int. Cl.
*F16M 11/18* (2006.01)
*F16M 11/04* (2006.01)
*F16M 11/12* (2006.01)
*G01D 11/30* (2006.01)

(52) U.S. Cl.
CPC .......... *F16M 11/18* (2013.01); *F16M 11/046* (2013.01); *F16M 11/126* (2013.01); *G01D 11/30* (2013.01)

(58) Field of Classification Search
CPC .... F16M 11/18; F16M 11/126; F16M 11/046; G01D 11/30; G01C 19/42; G01C 19/44
USPC ...................................... 248/550; 73/509.09
See application file for complete search history.

(56) References Cited

U.S. PATENT DOCUMENTS

| | | | | |
|---|---|---|---|---|
| 3,368,411 A | * | 2/1968 | Sann | G01C 19/02 74/5.4 |
| 4,490,724 A | * | 12/1984 | Bickman | F16M 11/123 343/765 |
| 2017/0254473 A1 | * | 9/2017 | Katz | F16M 11/123 |
| 2021/0031356 A1 | * | 2/2021 | Jhang | F16M 11/28 |

* cited by examiner

*Primary Examiner* — Muhammad Ijaz
(74) *Attorney, Agent, or Firm* — James M. Kasischke; Michael P. Stanley

(57) ABSTRACT

A stabilization system is provided with at least one sensor to measure and correct orientation of a platform relative to an inertial reference frame. A roll motor is affixed to a platform for pivoting the platform about a roll axis and an elevation motor is configured to rotate the platform about an elevation axis. A rotation motor pivots the platform about an azimuth axis. A control system using the sensor measurements, actuates the roll motor, elevation motor and the rotation motor to maintain a substantially constant orientation of the platform relative to the inertial frame of reference. The rotation motor, the elevation motor and the roll motor are spaced apart from each other along the azimuth axis.

12 Claims, 8 Drawing Sheets

THREE AXIS STABILIZATION PLATFORM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to a stabilization platform for directional components operating in a moving frame of reference, such as within a vehicle.

(2) Description of the Prior Art

Vehicles that operate with six degrees of freedom often carry sensors or other components that are sensitive to their orientation relative to a fixed frame of reference. For example, a directional antenna or an optical sensor needs to maintain a constant "line of sight" with an object outside of the vehicle carrying the antenna or optical sensor.

Some of these sensors or other components, referred to herein as "directional components", are housed in relatively small spaces. Such small or compact spaces include within a mast, a periscope, or the like. The size constraints of these spaces have allowed stabilization about one or two axes, but not three axes.

SUMMARY OF THE INVENTION

The present invention provides a compact assembly to which instruments, sensors, or other functional components can be mounted within a size-constrained space to allow three axes or the assembly to be stabilized.

The compact assembly stabilizes a platform along three different axes using three different motors. Sensor information about an inertial reference frame is used to activate motors that stabilize the platform relative to the reference frame. The assembly includes a roll motor, an elevation motor, and a rotation motor to adjust an orientation of the platform about a roll axis, an elevation axis, and an azimuth axis, respectively.

The stabilization system has a platform comprising a first face and a second opposing face with a roll motor coupled to the first face and for pivoting the platform about a roll axis. The system further includes an elevation motor to rotate the platform about an elevation axis, which can be orthogonal to the roll axis. Also, the system has a rotation motor to pivot the platform about an azimuth axis, which can be orthogonal to the elevation axis. The rotation motor, the elevation motor and the roll motor are spaced apart from each other along the azimuth axis.

The stabilization system includes an elevation drive shaft coupled with the platform and a transmission to couple the rotational output from the elevation motor with the drive shaft in order to transfer the rotational output from the elevation motor to the drive shaft. The platform, the roll motor, and the elevation motor can be housed in a compact sensor compartment.

The system includes a control system to actuate the roll motor, elevation motor and the rotation motor for maintaining a constant orientation of the platform relative to the inertial frame of reference.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION OF THE INVENTION

The following describes an inventive assembly and system to stabilize platforms along three orthogonal axes.

Vehicles that operate with six degrees of freedom often carry sensors or other components that are sensitive to their orientation relative to a fixed (or inertial) frame of reference. For example, a directional antenna or an optical sensor needs to maintain a consistent "line of sight" with an object outside of a vehicle carrying the antenna or optical sensor. When these directional components are housed in a compact space; the size constraints prevent the use of an assembly that can stabilize the directional components about three axes.

Accordingly, an assembly and system for providing stabilization on three axes in a compact form is described. The system provides a platform on which directional components are mounted. The platform may be independently pivotable or rotatable about an azimuth axis, rotatable or pivotable about an elevation axis, and pivotable or rotatable about a roll axis.

The system uses one or more additional sensors to obtain the vehicle orientation as an inertial reference frame and adjusts the orientation of the platform to keep the platform stable. Thus, even as the vehicle that houses the directional components is subject to roll, pitch, and/or yaw movements; the platform orientation can remain stable.

Figure 1:
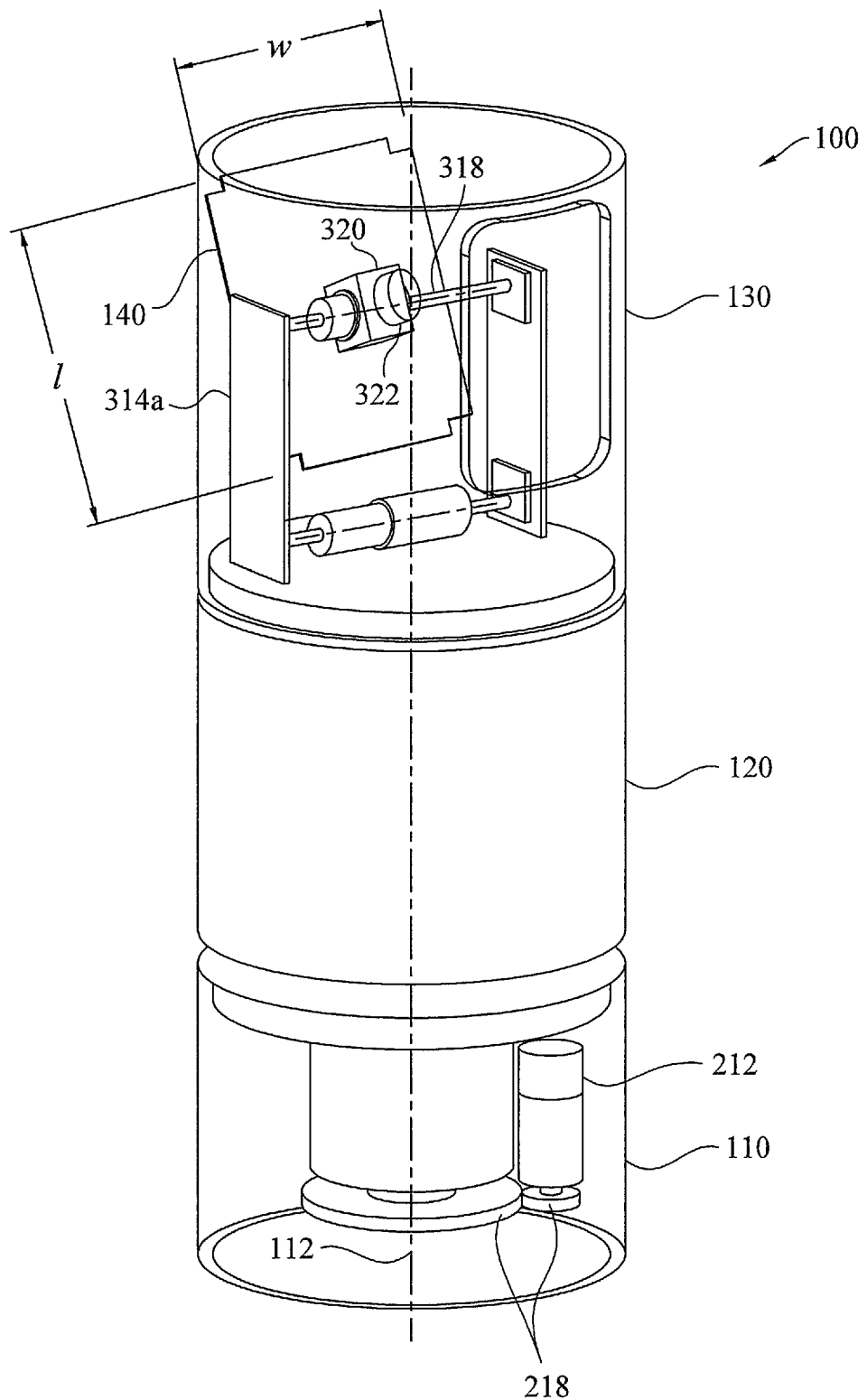
FIG. 1 is a semi-transparent view of a three axis stabilization assembly of the present invention.

Three axis stabilization is achieved through three mechanical assemblies (or actuators), each of which is controlled by a motor and a microcontroller. Positional feedback is from sensors such as encoders, gyroscopes, accelerometers, and magnetometers. FIG. 1 illustrates a three axis stabilization system 100. The stabilization system 100 includes a rotation compartment 110, a payload compartment 120, and a sensor compartment 130. Two or more of the compartments can be combined into one compartment.

A platform 140 is housed within the sensor compartment 130. The platform 140 is generally planar by defined opposed surfaces having substantially larger dimensions (e.g., "length" and "width" dimensions) compared to an orthogonal (e.g., "thickness") dimension separating the opposed surfaces. The platform 140 is generally rectangular, with one side of a length "l" and a second side of a width "w". Other platform shapes can be used without limitation. The directional components or instruments that require orientation stabilization are affixed to the platform 140.

The rotation compartment 110 acts as a base and houses components to pivot the platform 140 about an azimuth axis 112. For example, the rotation compartment 110 may be coupled to the sensor compartment 130 directly or via a coupling with the optional payload compartment 120. The components in the rotation compartment 110 rotate the coupled compartment(s), such that the platform 140 is pivoted about or rotated around the axis 112. The payload compartment 120 may house electronic components associated with instruments or components mounted on the platform 140. The payload compartment 120 also houses a control system for the stabilization system 100.

Figure 2:
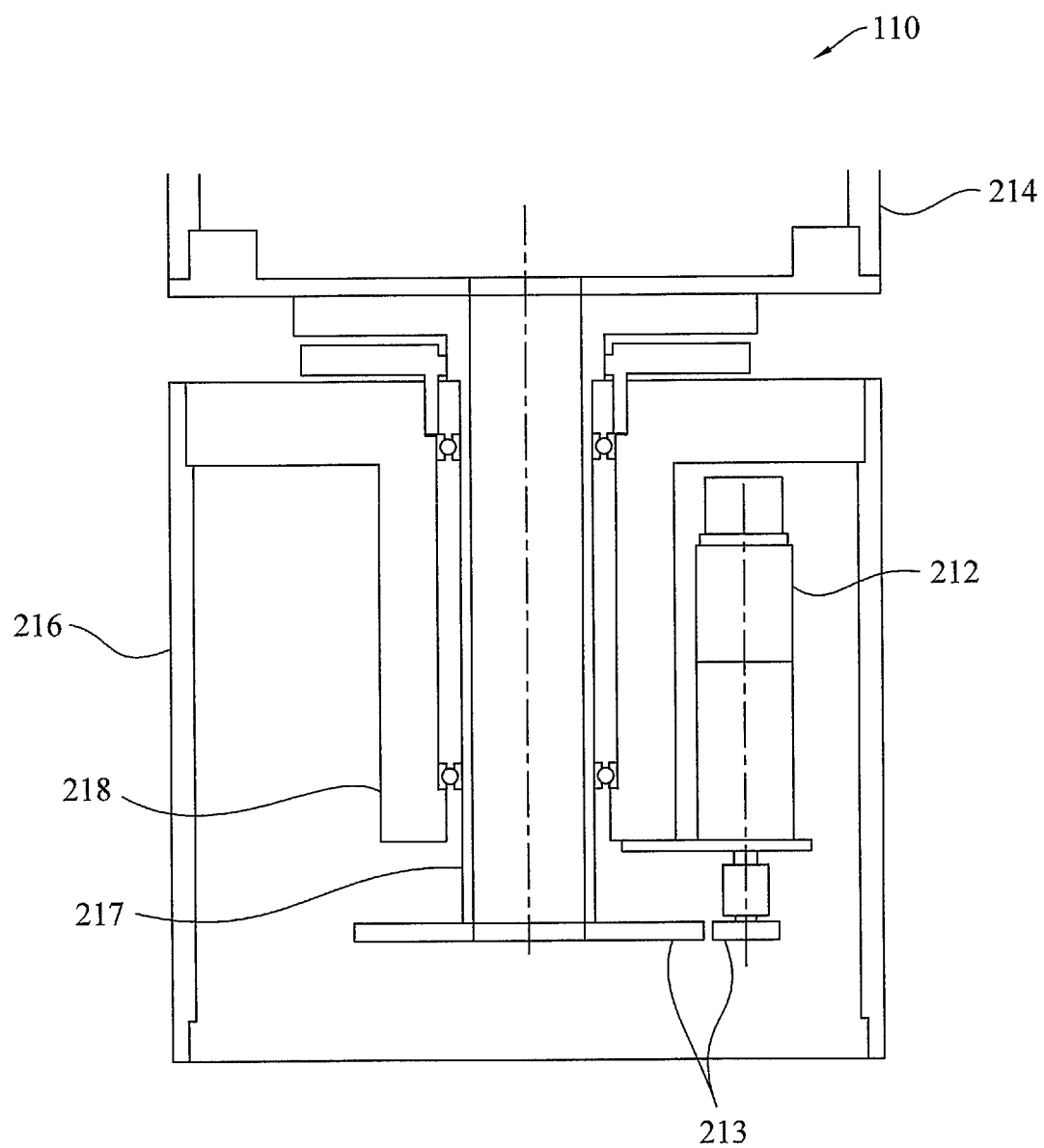
FIG. 2 is a cross-sectional view of a rotation component used in the stabilization assembly.

FIG. 2 is a cross-sectional view of a rotation component 110 that controls the orientation of the platform 140 relative to the azimuth axis 112. The rotation component 110 includes a rotation motor 212 and a motor encoder to provide closed loop feedback signals to the motor by tracking the speed and/or position of a motor shaft.

The rotation component 110 includes mated gears defining a geared coupling 213. The rotation component 110 further includes a rotation platform 214 that turns in relation to a housing 216. A rotor 217 is coupled to the azimuthal rotation platform 214 and is disposed within a stator 218. The rotor 217 includes an interior central channel which allows wiring to pass from the payload compartment 120. The rotation motor 212 is a servo motor that rotates the rotor by the geared coupling 213.

Figure 3:
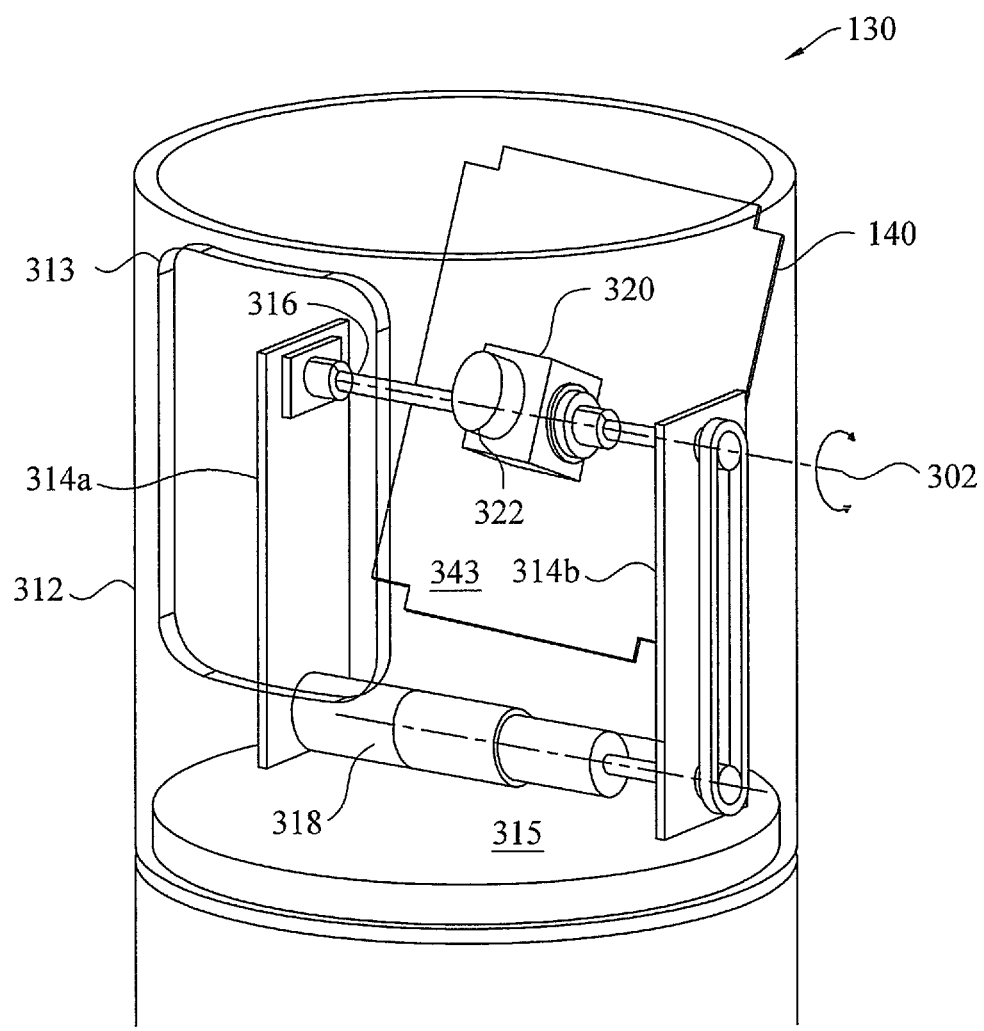
FIG. 3 shows a first semi-transparent and isometric view of a sensor compartment used in the stabilization system.
Figure 4:
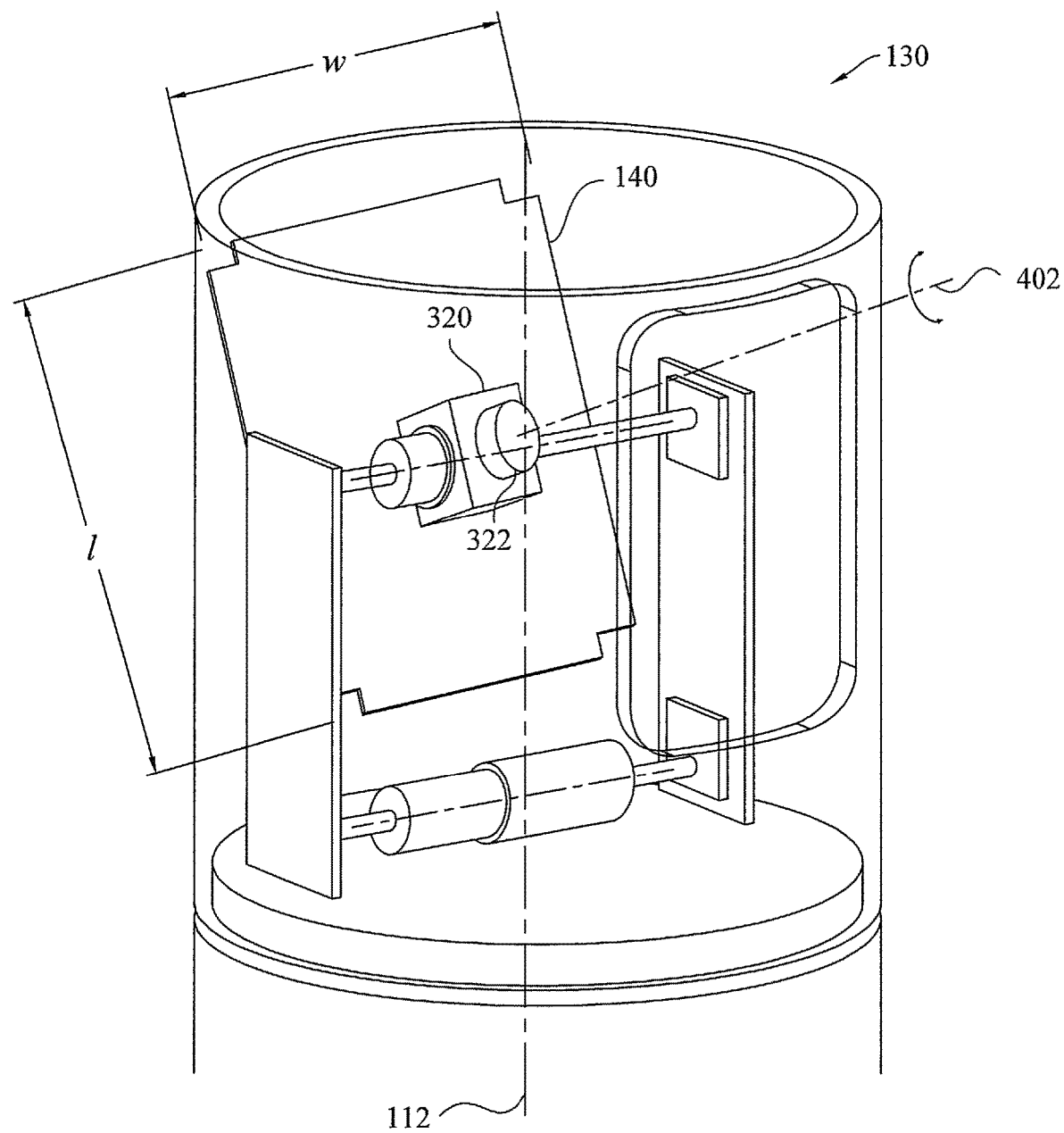
FIG. 4 shows a second semi-transparent and isometric view of the sensor compartment.
Figure 5:
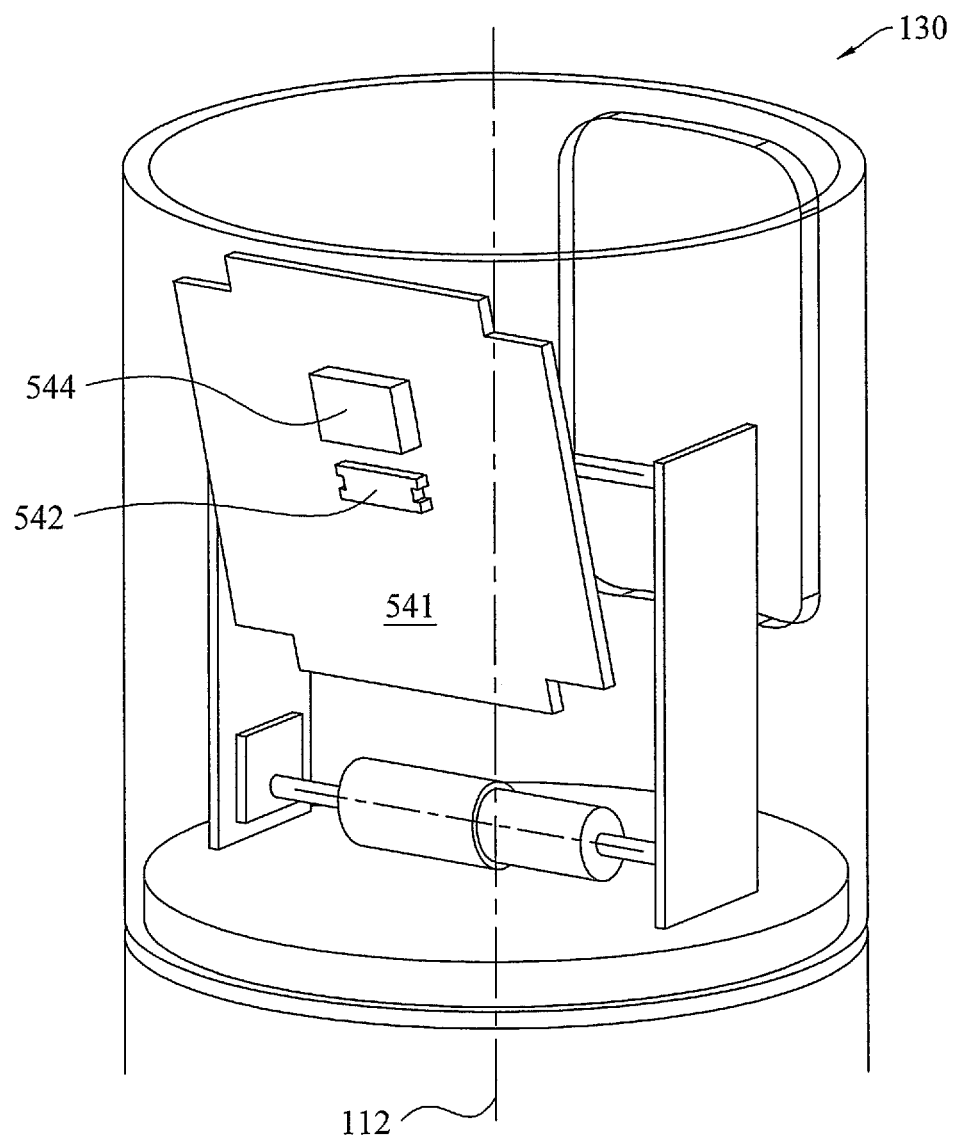
FIG. 5 shows a third semi-transparent and isometric view of the sensor compartment.

FIG. 3, FIG. 4 and FIG. 5 illustrate the sensor compartment 130. FIG. 3 shows a first isometric view of the sensor compartment 130. The sensor compartment 130 includes a housing 312, which may be cylindrical or otherwise shaped to fit into and rotate within a space in the vehicle. The housing 312 may be coextensive with or an extension of the housing 212. The rotation platform 214 is affixed within the compartment 130.

Alternatively, the housing 312 may be affixed to a payload compartment 120. The housing 312 includes an aperture 313. The aperture 313 is sized to permit access to an interior of the housing 312 for maintenance or to exchange components coupled to a platform 140.

The sensor compartment 130 includes components to stabilize the platform 140 about an elevation axis 302. The elevation axis 302 can be orthogonal to the azimuth axis 112.

Two vertical supports 314a and 314b are secured to a base 315 of the sensor compartment 300. A cross-member or elevation drive shaft 316 extends therebetween and is supported by the upper ends of the vertical supports 314a and 314b. The vertical supports 314a and 314b have a height measured from the base 315 that provides sufficient clearance for the platform 140 to move under the elevation drive shaft 316 without interfering with the base 315 and an elevation motor 318. The height from the base 315 to the elevation drive shaft 316 may be greater than the sum of a height of the elevation motor 318 and half of the length of the platform 140.

The elevation drive shaft 316 is also coupled to a roll motor support 320. The roll motor support 320 supports a roll motor 322. The elevation drive shaft 316 may be a unitary piece that extends through the roll motor support 320 and is fixed thereto. Alternatively, the elevation drive shaft 316 may comprise two separate shaft pieces that are coupled by one end to the roll motor support 320 and by another other end to a vertical support 314 in which both shaft pieces define the elevation axis 302.

The elevation drive shaft 316 is coupled to the elevation motor 318 mounted near the base 315. The elevation drive shaft 316 is actuated by a transmission driven by the elevation motor 318. The transmission couples the rotational output from the elevation motor 318 with the elevation drive shaft 316 to transfer the rotational output from the elevation motor to the elevation drive shaft. An output rotation from the elevation motor 318 drives the transmission, which directs the elevation drive shaft 316 to pivot about the elevation axis 302.

As the elevation drive shaft 316 pivots about the elevation axis 302, the platform 140 rotates around the axis to provide a pitch (elevation) adjustment to the platform. The elevation motor 318 may include an integral encoder used for feedback in a closed loop control of the elevation angle. When activated, the elevation motor 318 causes the elevation drive shaft 316 to pivot on the elevation axis 302. This pivoting causes the roll motor support 320 and the platform 140 to rotate around the elevation axis 302. The rotational output from the elevation motor 318 may be longitudinally offset along the azimuth (or another longitudinal) axis from the elevation axis 302.

FIG. 4 shows a second isometric view of the sensor compartment 300. The view is rotated about the azimuth axis at approximately 90 degrees from the view shown in FIG. 3. The third axis of stabilization occurs about a roll axis 402. The roll axis 402 can be orthogonal to the elevation axis 302 and to the platform 140. When activated, the roll motor 322 causes the platform 140 to pivot about the roll axis 402.

The roll motor 322 is coupled to the platform 140 at the center of the platform that is a distance of l/2 from one side of the platform in the length direction and w/2 from an orthogonal side in the width direction. Alternatively, the connection point may be off-center but is configured to cause a centroid on the platform 140 to rotate around the roll axis when the roll motor 322 is activated.

The components of the stabilization system 100 can be longitudinally spaced apart from each other along the azimuth axis. Such spacing in combination with rotation-to-rotation transmissions allows orientation adjustment with three-degrees-of-freedom (e.g., pitch, yaw and roll), while fitting in a constrained physical environment (e.g., within a small or narrow passageway or other housing structure).

FIG. 5 shows a third isometric view of the sensor compartment 130. The view is rotated about the azimuth axis 112 at approximately 90 degrees from the view shown in FIG. 4 and at approximately 180 degrees from the view shown in FIG. 3. An opposing surface 541 of the platform 140 is shown. One or more sensors 542 are mounted on the platform 140 at or near the center of the platform.

The sensor 542 is a gyroscope, an accelerometer, a magnetometer, a combination thereof, or any other sensors configured to provide orientation information pertaining to the platform 140. The sensor 542 is sensitive to orientation in three-degrees-of-rotation relative to an inertial frame of reference.

One or more directional components 544 may also be mounted on the platform 140. The directional components 544 include any devices or instruments that require a stabilized platform in order to function effectively. For example, the directional component 544 may be mounted to the surface 541 in FIG. 5 or may be mounted to an opposed surface 343 shown in FIG. 3.

Figure 6:
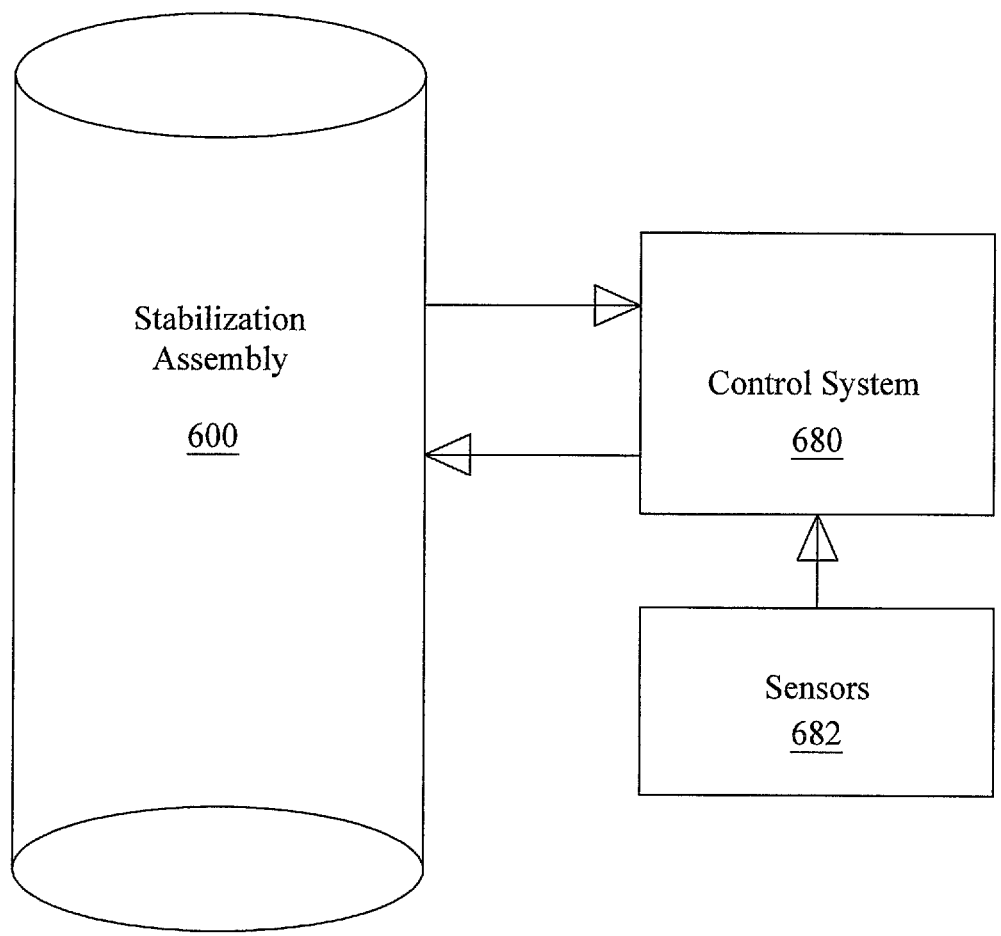
FIG. 6 shows a block diagram of a three-axis stabilization system.

FIG. 6 depicts a block diagram of a stabilization assembly 600 in communication with a control system 680. The control system 680 includes logic circuitry and machine instructions to receive orientation information from sensors 682 and to determine stabilization operations. The sensors 682 may be coupled to an inertial reference frame or to stationary parts of the stabilization assembly 600.

The sensors 682 may measure orientation information relative to the inertial reference frame and do not include the sensor 542. For example, the sensors 682 may measure altitude, depth below sea level, velocity and/or acceleration, global position coordinates, pitch, yaw, roll or other attitude information. When responsive to receiving sensor information from the sensors 682 and when a change in vehicle attitude occurs; the control system 680 determines that a change to the orientation of the platform 140 is needed.

The control system 680 generates and communicates control signals to one or more of the motors in the stabilization assembly 600 to make the determined change to the orientation of the platform 140. The control system 680 can receive positional feedback about the orientation of the platform 140 from the sensors mounted to the platform. The control system 680, the sensors 682 or both can be installed in the payload compartment 120.

Figure 7:
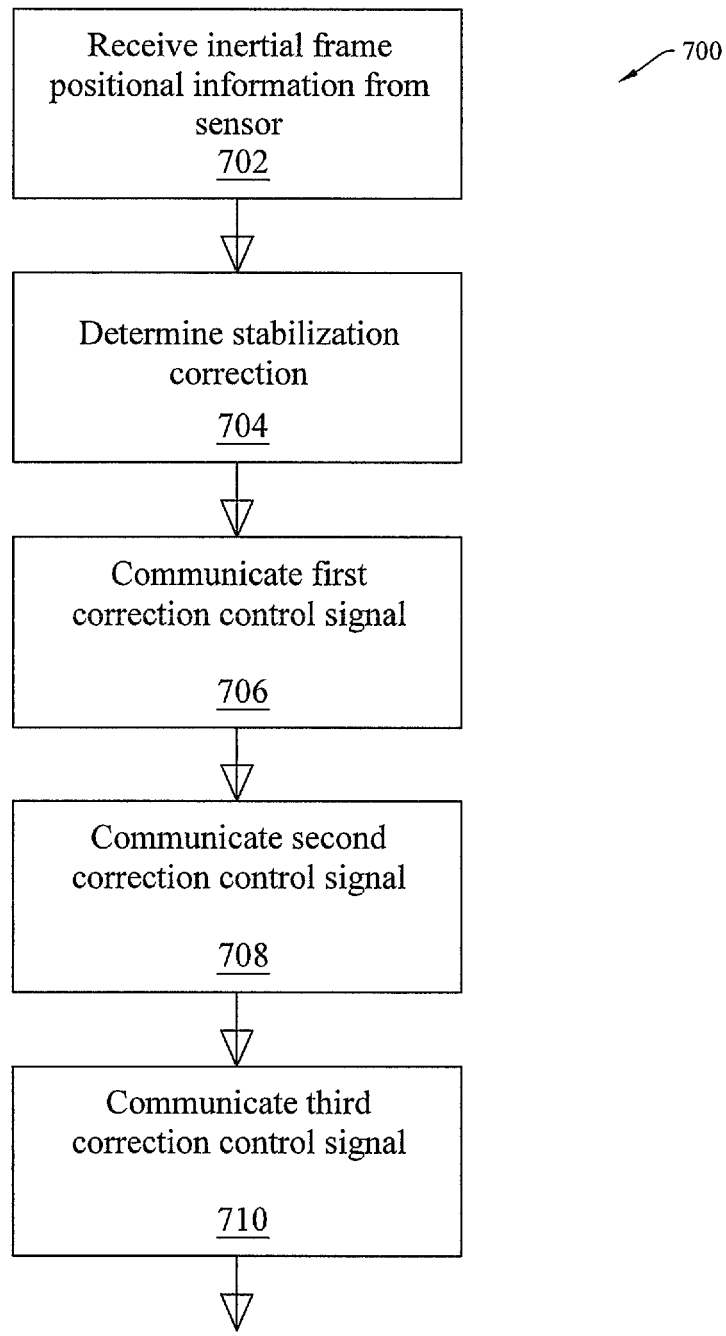
FIG. 7 shows an example of control logic performed by the three axis stabilization system.

Referring now to FIG. 7, a control logic 700 is performed by the control system 680. The control logic 700 receives inertial frame orientation information from a sensor at block 702. For example, the control system 680 may receive information from the sensor 682 and from the sensor 542. The information received from the sensor 682 includes orientation of the inertial reference frame. The information received from the sensor 542 relates to the orientation of the platform 140.

The control logic 700 determines that a stabilization correction is needed and determines which corrections are needed at block 704. For example, the control system 680 may compare information from the sensor 542 from two or more sample times and determine that the platform has changed orientation. The control system 680 may also compare information from the sensors 682 for the same sample times to determine a change in orientation. Based on the change in orientation, the control system 680 calculates or otherwise determines what changes to the orientation are needed. The control system 680 then determines which motors to activate and how to activate them.

The control logic 700 communicates a first control signal to one of the motors at block 706. The control signal, when received by a motor, causes the motor to rotate or pivot the platform about the axis associated with the motor. The control signal may indicate a degree of turn and a direction. For example, the control signal in block 706 may be communicated to the rotation motor and may cause the rotation motor to turn the rotor in a clockwise direction.

The control system 680 may activate the motors in a predetermined sequence. For example, the control system 680 may activate the rotation motor 216 first, then the roll motor 322, and then the elevation motor 318. If a correction about one axis is not needed; then no communication signal may be communicated to the motor associated with that axis. The control system 680 may also determine a sequence of motor activation each time that a correction to an orientation is needed.

When more than one axis is determined to need stabilization, the control logic 700 may communicate a second control signal to a second one of the motors at block 708. For example, the control logic 700 may communicate a control signal to the elevation motor 318. When stabilization about a third axis is also needed, the control logic 700 may communicate a third control signal to the third of the motors at block 710.

Although depicted as a series of operations, two or more of the blocks 706, 708 and 710 can be performed in parallel, or independently of each other.

Figure 8:
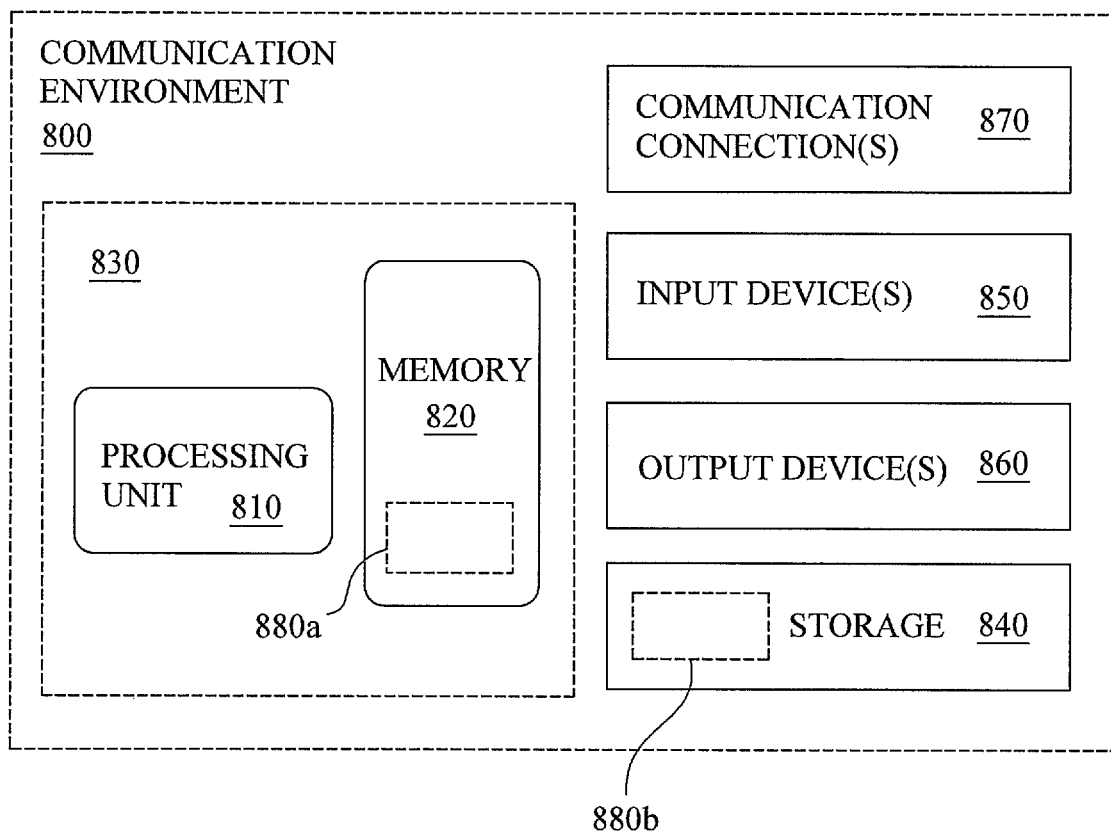
FIG. 8 shows a block diagram of a computing environment suitable for implementing the disclosed stabilization.

FIG. 8 illustrates a generalized example of a suitable communication environment 800. The environment 800 includes at least one central processing unit 810 and a memory 820. A basic configuration 830 is included within a dashed line. The central processing unit 810 executes computer-executable instructions and may be a real or a virtual processor.

The memory 820 may be volatile memory or non-volatile memory or a combination of the two. The memory 820 stores software 880a that can implement one or more of the technologies described herein, when executed by a processor.

The communication environment 800 includes storage 840, one or more input devices 850, one or more output devices 860 and one or more communication connections 870. An interconnection mechanism (not shown) interconnects the components of the communication environment 800. Typically, operating system software (not shown) provides an operating environment for other software executing in the communication environment 800 and coordinates activities of the components of the computing environment.

The storage 840 may be removable or non-removable and can include selected forms of machine-readable media. The storage 840 can store instructions for the software 880b, which can implement technologies described herein.

It will be appreciated that the configurations disclosed herein are exemplary in nature, and that these embodiments are not to be considered as limiting, because variations are possible. The present invention includes novel and non-obvious combinations and sub-combinations of the various systems and configurations, and other features, functions, and/or properties disclosed herein.

What is claimed is:

1. A stabilization system comprising:
   at least one sensor to measure orientation relative to an inertial reference frame of reference;
   a platform having a first face and a second opposite face;
   a roll motor with a housing, said roll motor affixed to the first face and capable of pivoting said platform about a roll axis;
   an elevation motor capable of rotating said platform about an elevation axis wherein the elevation axis is orthogonal to the roll axis;
   a rotation motor capable of pivoting the platform about an azimuth axis wherein the azimuth axis is orthogonal to the elevation axis; and
   a control system capable of actuating at least one of said roll motor, said elevation motor and said rotation motor to maintain a substantially constant orientation of said platform relative to the inertial frame of reference;

wherein said rotation motor, said elevation motor and said roll motor are spaced apart from each other along the azimuth axis.

2. The stabilization system of claim 1, further comprising a first compartment and a second compartment, wherein said rotation motor is housed in said first compartment, said elevation motor and said roll motor are housed in said second compartment longitudinally spaced apart from each other and coupled to said first compartment along the azimuth axis.

3. The stabilization system of claim 2, further comprising a third compartment longitudinally spaced apart from said first compartment and said second compartment, wherein said third compartment is coupled to said first compartment and to said second compartment along the azimuth axis.

4. The stabilization system of claim 3, wherein said control system is housed in said third compartment.

5. The stabilization system of claim 1, wherein a rotational output from said elevation motor is longitudinally offset along the azimuth axis from the elevation axis about which said platform rotates.

6. The stabilization system of claim 1, further comprising an elevation drive shaft coupled with said platform and a transmission so configured to mechanically couple a rotational output from said elevation motor with said elevation drive shaft as to transfer the rotational output from said elevation motor to said elevation drive shaft.

7. The stabilization system of claim 6, wherein said platform, said roll motor and said elevation motor are housed in a sensor compartment comprising:
 a cylindrical housing with a base;
 a pair of spaced-apart vertical supports extending upward from said base in an interior of said cylindrical housing such that each of said vertical supports has an upward end; and
 a cross-member rotatably coupled to the upward end of each of said vertical supports and fixedly coupled to said housing of said roll motor and configured to be rotated by said elevation motor;
 wherein said housing of said roll motor by attachment to the first face of said platform, allows the roll axis to orthogonally intersect a center of said platform.

8. The stabilization system of claim 1, further comprising at least one directional component coupled to said platform.

9. A stabilization system comprising:
 at least one sensor to measure orientation relative to an inertial frame of reference;
 a platform having a first face and a second opposite face;
 a roll motor with a housing, said roll motor affixed to the first face and capable of pivoting said platform about a roll axis;
 an elevation motor capable of rotating said platform about an elevation axis wherein the elevation axis is orthogonal to the roll axis; and
 a rotation motor capable of pivoting said platform about an azimuth axis wherein the azimuth axis is orthogonal to the elevation axis;
 wherein said rotation motor, said elevation motor and said roll motor are spaced apart from each other along the azimuth axis.

10. The stabilization system of claim 9, wherein a rotational output from said elevation motor is longitudinally offset along the azimuth axis from the elevation axis about which said platform rotates.

11. The stabilization system of claim 10, further comprising an elevation drive shaft coupled with said platform and a transmission so configured to mechanically couple the rotational output from said elevation motor with said elevation drive shaft as to transfer the rotational output from said elevation motor to said elevation drive shaft.

12. The stabilization system of claim 11, wherein said platform, said roll motor and said elevation motor are housed in a sensor compartment comprising:
 a cylindrical housing with a base;
 a pair of spaced-apart vertical supports extending upward from said base in an interior of said cylindrical housing such that each of said vertical supports has an upward end; and
 a cross-member rotatably coupled to the upward end of each of said vertical supports and fixedly coupled to said housing of said roll motor and configured to be rotated by said elevation motor;
 wherein said housing of said roll motor by attachment to the first face of said platform, allows the roll axis to orthogonally intersect a center of said platform.

\* \* \* \* \*